Patented Apr. 12, 1938

2,114,125

UNITED STATES PATENT OFFICE 2,114,125

INSECTICIDAL EMULSION

Arthur Gustav Kaufmann, Associated, Calif., assignor, by mesne assignments, to Tide Water Associated Oil Company, a corporation of Delaware No Drawing. Application March 11, 1935, Serial No. 10,460

3 Claims. (Cl. 167—43)

This invention relates to improvements in insecticidal oil spray emulsions and has for its principal object the dispersal of insect poisons in oils such as petroleum oils, or distillates thereof.

Another object of the invention is to disperse insect poisons in oils as above mentioned, which poisons are normally insoluble in the oil in the generally accepted sense of the word, but which are substantially and practically rendered oil soluble by the method of dispersion or suspension in the oil, inasmuch as the fineness of dispersion and stability of the suspension is the full equivalent of the action of a solution.

Another object is to provide an oil spray emulsion of concentrated form which contains an insect poison suspended therein in substantially colloidal form which is capable of further dispersion in water for application to plants, foliage and the like as an insecticide.

Another object of the invention is to provide an insecticidal emulsion of the above mentioned types in which further oil soluble parasiticides and/or ovicides and/or insecticides and/or fungicides are dispersed.

Among the commonly known forms of effective insecticides are the different lead arsenates which include both the acid and basic forms, all of which are subject to the scope of this invention with regard to maintaining the same as a stable dispersion in a hydrocarbon oil in the form of an emulsion.

In the use of lead arsenate as an insecticide in conjunction with oil, heretofore the common methods for mixing have only served to produce a very temporary dispersion so that aggregates of lead arsenates and oil can never be said in any sense to approach an emulsified form, such as is an object of this invention.

The result of such a mixture of the old types is a very ineffective dispersion of the poison and the oil so that the poison may be said to be "bunched" instead of having a uniform distribution. This means of course that the application of such mechanical mixtures results in a very low percentage of insect kill and is a very inefficient method of applying lead arsenate as an insect poison in an oil carrier.

While the invention is applicable in its terms to all the known lead arsenates, there is one lead arsenate, which is outstanding in its effect in this invention and is therefore markedly preferred in an embodiment of the invention, which is known as the basic lead arsenate.

Basic lead arsenate, as is usually known in commerce and as is used herein, is probably a mixture of the monobasic and dibasic arsenate and has approximately a formula of $Pb_3As_2O_8$.

The use of such basic lead arsenate forms the highest quality of stable emulsion with oil and water when mixed with certain emulsifying agents in the various proportions and ranges hereinafter set forth.

In preparing an emulsion in which the lead arsenate is in such colloidal suspension that for all purposes there is no practical difference to a truly oil soluble material, the lead arsenate is added to certain compounds to form an oil in water emulsion in which the lead arsenate is wetted by soap.

Such soap may be formed first by mixing an alcohol, such as glycerol, glycol, etc., or mixtures thereof, with an aliphatic amine, such as triethanolamine, butanolamine, etc., or mixtures thereof, and a percentage of water, and while mixing the above with water at a temperature preferably of about 120° F., a percentage of a fatty acid, such as oleic acid, stearic acid, ricinoleic acid, etc., or mixtures thereof, will be slowly added so as to avoid lumping.

When the above solution has been agitated sufficiently to be homogeneous, a lead arsenate, preferably the above recited basic lead arsenate which is preferably in finely powdered form, is added slowly with agitation until a stable homogeneous suspension of lead arsenate is formed in the soap.

In order to complete the dispersion of the above lead arsenate solution in an insecticidal carrier, to the same is then slowly added a hydrocarbon oil, which may be either highly refined or not depending on its application, or use, and agitated in well known manner as for instance by circulating under a sufficiently strong pressure to keep the lead arsenate in suspension and prevent it from separating. Such agitation is kept up for a period to assure the thorough mixing of the oil with the lead arsenate solution to form a homogeneous mixture. By the selection of the proper ingredients, it is also possible to make a stable suspension, or emulsion, which will remain suspended indefinitely under normal atmospheric conditions.

Broadly, the invention resolves itself into forming a colloidal suspension of lead arsenate in an emulsion comprising an alcoholic soap stock, water and a hydrocarbon oil, the soap stock including a fatty acid, an aliphatic amine, and an alcohol. To such emulsion may be added, as desired, as for a particular parasiticidal purpose, certain oil soluble organic, metal organic, or vegetable origin compounds such as the oleates, naphthenates, resinates and the like of copper, aluminum, zinc and the like, or nicotine, pyrethrum extracts, pine oil, etc., or mixtures of such oil soluble compounds, which may be mixed as desired with the hydrocarbon oil in practically any desired quantity but preferably in percentages of from 0.1% to 10% of such oil and preferably before mixing with said soap. The soap is an essential factor in suspending the lead arsenate and one skilled in the art may vary the percentages of the constituents thereof greatly to obtain the desired result depending on the physical and chemical constants of said constituents of such soap, such as molecular weights, saponification number of the fatty acid, the alkalinity of the base, or other constants, so that the range of percentages must be coordinated with the skill of those used to compounding emulsions.

In forming a stable emulsion with lead arsenate, the alcoholic soap stock may range from 0.1% to 10%, the lead arsenate may range from 0.1% to 50%, the water from 1% to 30% and the balance up to 100% will be a hydrocarbon oil of any of the types described.

The constituents of the alcoholic soap stock comprise a fatty acid from 1.5% to 3% of the above emulsion, an aliphatic amine from 0.5% to 1.5% of the above emulsion, and an alcohol from 0.75% to 1.5% of the above emulsion. Depending on the constituents used, the emulsion may be acid, neutral or basic in character, but a preferred embodiment gives an emulsion of basic character in accordance with the preferred ingredients following.

The preferred percentages of the above materials to form one desired stable emulsion are as follows:

| | Percent by weight |
|---|---|
| Oleic acid | 2.16 |
| Triethanolamine | 0.80 |
| Glycerol | 1.20 |
| Water | 14.0 |
| Basic lead arsenate | 12.0 |
| Hydrocarbon oil | 69.84 |
| | 100.00 |

The range of hydrocarbon oils to be emulsified with the lead arsenate solution may cover the entire range of hydrocarbon oils from crude oils to kerosene, and any of such oils may be of the so-called white oil class which has high unsulphonatable residue up to 100% unsulphonation by the usual well known tests. However, any range of refinement of the hydrocarbon oil may be used in connection with this insecticidal oil within the scope of this invention. And such mineral oil may be of any gravity or viscosity, but it is found that a lubricating oil is especially adaptable for use with the above emulsion, such as a neutral oil having a viscosity Saybolt Universal of from 60 to 100 seconds at 100° F., and a gravity between 20° and 32° A. P. I.

The above formula, or any formula selected within the given ranges of percentages, may be diluted with further water up to at least 300 times its volume to form a more dilute emulsion for spraying in less concentrated form by any well known spraying methods where a fine mist is laid down, or required, for coverage, but also may be used in the concentrated form particularly for spraying orchards, crops or the like from aeroplanes by likewise using any of the well known types of spraying apparatus where dilution water is not added.

The concentrated lead arsenate emulsion described herein is especially valuable as a combined spreader and poison for use in the invention of my copending application S. N. 707,854, filed January 22, 1934, in which a partially esterified polyhydric alcohol with high molecular weight organic acids mixed with oil is easily emulsifiable with water, but it should be understood that the compositions herein disclosed may be mixed with other spreaders when diluted with further water as described, or even with further oil, to get greater coverage.

Such spreaders may be sodium hydroxide, sodium carbonate, lime, sodium metasilicate, fluorsilicate, sodium phosphate, clays, skim milk, casein and its compounds, albumen, or mixtures thereof, known in the art to be useful for this purpose, which are water soluble or form a colloidal suspension in water for the desired purpose.

These spreaders are added first with proper agitation to water in the spray mix tank to be thoroughly dissolved and/or dispersed, or suspended, and then the above described emulsifiable oil is added with agitation to such solution or suspension to form an emulsion for spray purposes. Additionally, the concentrated lead arsenate emulsion above described may be dispersed first, in the water in the spray mix tank with agitation and then the oil, made emulsifiable by the addition of said partially esterified product, may be dispersed therein to form a spray emulsion containing a combined spreader and poison which is practically oil soluble for the desired purpose. Or the above described concentrated lead arsenate emulsion may be dispersed in the water together with the types of spreaders, as described above, to be thereafter mixed with the said emulsifiable oil as described.

It must be noted that the described soap stock is not only a concentrated emulsion in itself but is likewise an emulsifier for use with hydrocarbon oils.

In consequence, it has many applications in its use. For instance, during the compounding of such soap stock, or emulsifier, it may be made for use as an insecticidal spray by incorporating therewith oil soluble, or oil insoluble, parasiticides, or toxic material, dispersed or dissolved in a bonding agent, or carrier, and such emulsion can be further diluted with oil, or water, or both, when used in less concentrated form as an insecticidal spray.

Such parasiticides, including the described lead arsenate, may include not only the before described parasiticides, but also other insecticidal compounds, such as organic metal salts like mercury phenates, mercury carbolates, barium oleate and the like and such bonding agents may include any of the alcohols, fatty acids, esters and the like.

Further, such additional toxic agents incorporated in such bonding agents may likewise be added to the before described lead arsenate emulsion, which may then be further diluted with oil, or water, or both, for use in less concentrated form as an insecticidal spray.

I claim as my invention:

1. The process of preparing a flowable and substantially permanent emulsion for insecticidal use which comprises forming a soap stock by mixing slowly together, so as to avoid lumping, a polyhydric alcohol, an alkylolamine, a high molecular weight fatty acid, and water, with sufficient agitation to form a homogeneous mixture; slowly adding basic lead arsenate to said soap stock with sufficient agitation to form a suspension of the arsenate, and finally adding a hydrocarbon oil to the mixture with sufficient agitation to maintain the suspension of the lead arsenate; said emulsion being fluid and remaining sufficiently stable for spraying upon dilution with further water up to about three hundred times the volume of the emulsion; the proportions by weight of the recited ingredients being roughly as follows: alcohol 1¼%, acid and amine together from 2 to 4½%, water 14%, arsenate 12%, and oil to make 100%.

2. A stable insecticidal emulsion comprising a soap of a high molecular weight fatty acid and an alkylolamine roughly 3% by weight, polyhydric alcohol roughly 1.2% by weight, water roughly 14% by weight, lead arsenate roughly 12% by weight and sufficient hydrocarbon oil to make up 100%, said emulsion remaining sufficiently stable for spraying upon dilution with further water up to about three hundred times the volume of the emulsion.

3. A flowable and substantially permanent insecticidal emulsion suitable for use for orchard spraying from airplanes, in which lead arsenate is suspended in oil, comprising roughly by weight, glycerol 1.2%; water 14%; a soap of oleic acid and triethanolamine, 3%; lead arsenate 12%; and hydrocarbon oil to make up 100%, that is roughly 70%; said emulsion remaining sufficiently stable for spraying upon dilution with further water up to about three hundred times the volume of the emulsion.

ARTHUR GUSTAV KAUFMANN.